US009340972B2

(12) United States Patent
Naidoo

(10) Patent No.: US 9,340,972 B2
(45) Date of Patent: *May 17, 2016

(54) BUILDING PANEL, BUILDING SYSTEM AND METHOD OF CONSTRUCTING A BUILDING

(71) Applicant: FBM LICENCE LIMITED, Subiaco (AU)

(72) Inventor: Kubashen Jerome Naidoo, Hillarys (AU)

(73) Assignee: FBM LICENCE LIMITED, Subiaco (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,170

(22) Filed: Apr. 14, 2014

(65) Prior Publication Data

US 2014/0215947 A1    Aug. 7, 2014

Related U.S. Application Data

(63) Continuation of application No. 13/505,952, filed as application No. PCT/AU2011/001293 on Oct. 11, 2011, now Pat. No. 8,733,046.

(30) Foreign Application Priority Data

| Oct. 11, 2010 | (AU) | 2010904524 |
| Oct. 27, 2010 | (AU) | 2010904789 |
| Apr. 20, 2011 | (AU) | 2011901478 |

(51) Int. Cl.
*E04C 1/00*      (2006.01)
*E04B 2/02*      (2006.01)
(Continued)

(52) U.S. Cl.
CPC . *E04B 2/02* (2013.01); *B32B 13/02* (2013.01); *B32B 27/302* (2013.01); *B32B 27/40* (2013.01);
(Continued)

(58) Field of Classification Search
CPC ......... E04B 2/822; E04B 2/7403; E04B 2/02; E04B 1/66; E04B 1/14; E04C 2/243; E04C 2/384; E04C 2/34; E04C 2/20; E04C 2/296; E04C 2/288; B32B 27/40; B32B 13/02; B32B 27/302; E04G 25/061; E04G 25/00; E04G 25/065
USPC .................................. 52/309.4, 173.3, 126.3
See application file for complete search history.

(56) References Cited

U.S. PATENT DOCUMENTS

| 3,511,731 A | 5/1970 | Raynal |
| 3,512,819 A | 5/1970 | Morgan et al. |

(Continued)

FOREIGN PATENT DOCUMENTS

| CA | 1126144 A | 6/1982 |
| CN | 201486032 | 5/2010 |

(Continued)

OTHER PUBLICATIONS

International Search Report for PCT application PCT/AU2011/001293 dated Jan. 27, 2012, 4 pages.

(Continued)

*Primary Examiner* — Basil Katcheves
(74) *Attorney, Agent, or Firm* — Heslin Rothenberg Farley & Mesiti P.C.; Jacquelyn Graff

(57) ABSTRACT

A building system comprising: a building panel comprising first and second outer sheet members, an inner sheet member disposed between the first and second outer sheet members, and solid insulating material disposed between the first and second outer sheet members and the inner sheet member; a first track member, the first track member and the building panel being arranged such that the panel is engagable along a first side with the first track member and the first track member is connectable to the first and second outer sheet members; a second track member, the second track member and the building panel being arranged such that the panel is engagable along a second side with the second track member and the second track member is connectable to the first and second outer sheet members and the inner sheet member.

18 Claims, 13 Drawing Sheets

(51) Int. Cl.

| | |
|---|---|
| *E04B 1/14* | (2006.01) |
| *E04C 2/288* | (2006.01) |
| *E04C 2/296* | (2006.01) |
| *E04G 25/00* | (2006.01) |
| *E04G 25/06* | (2006.01) |
| *B32B 13/02* | (2006.01) |
| *B32B 27/30* | (2006.01) |
| *B32B 27/40* | (2006.01) |
| *E04B 1/66* | (2006.01) |
| *E04C 2/20* | (2006.01) |
| *E04C 2/24* | (2006.01) |
| *E04C 2/34* | (2006.01) |
| *E04C 2/38* | (2006.01) |

(52) U.S. Cl.
CPC ... *E04B 1/14* (2013.01); *E04B 1/66* (2013.01); *E04C 2/20* (2013.01); *E04C 2/243* (2013.01); *E04C 2/288* (2013.01); *E04C 2/296* (2013.01); *E04C 2/34* (2013.01); *E04C 2/384* (2013.01); *E04G 25/00* (2013.01); *E04G 25/061* (2013.01); *E04G 25/065* (2013.01); *B32B 2317/16* (2013.01); *B32B 2419/00* (2013.01); *E04B 2002/0232* (2013.01); *E04B 2002/0256* (2013.01)

(56) References Cited

U.S. PATENT DOCUMENTS

| | | |
|---|---|---|
| 3,553,921 A | 1/1971 | Breistein |
| 3,640,039 A | 2/1972 | McKee et al. |
| 3,719,016 A | 3/1973 | Randolph |
| 3,924,369 A | 12/1975 | Guarino et al. |
| 4,208,228 A | 6/1980 | Johansson |
| 4,324,834 A | 4/1982 | Page et al. |
| 5,524,400 A | 6/1996 | Schmechel |
| 5,592,794 A | 1/1997 | Tundaun |
| 5,681,639 A | 10/1997 | Minagawa et al. |
| 6,167,624 B1 | 1/2001 | Lanahan et al. |
| 6,352,657 B1 | 3/2002 | Veldhuis et al. |
| 8,127,509 B2 | 3/2012 | Propst |
| 2010/0266833 A1 | 10/2010 | Day et al. |

FOREIGN PATENT DOCUMENTS

| | | |
|---|---|---|
| GB | 2450359 A | 12/2008 |
| JP | 2000052466 A | 2/2000 |
| SU | 1184841 A | 10/1985 |
| WO | 0171119 | 9/2001 |
| WO | 2006070280 | 7/2006 |
| WO | 2006086228 | 8/2006 |

OTHER PUBLICATIONS

Examination Report for AU application AU2013270495 dated Feb. 13, 2014, 3 pages.

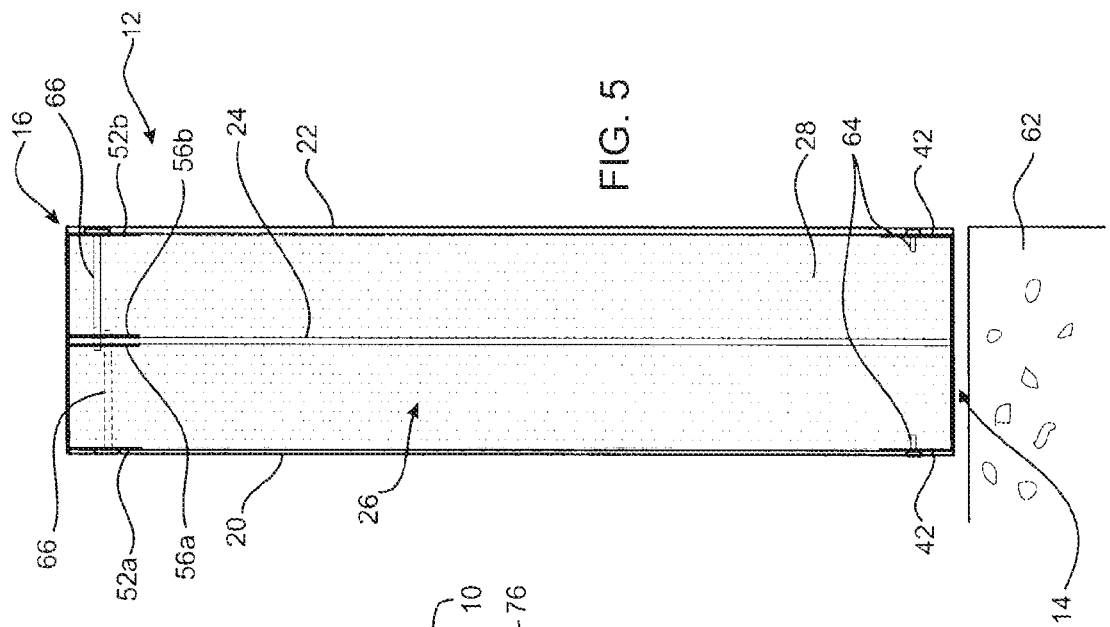
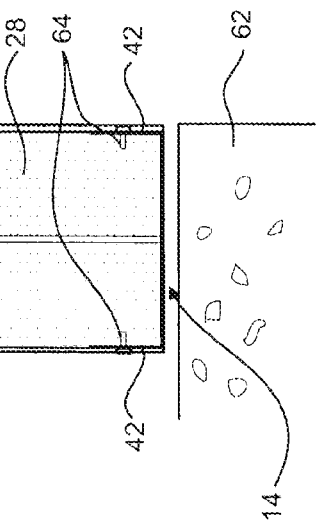
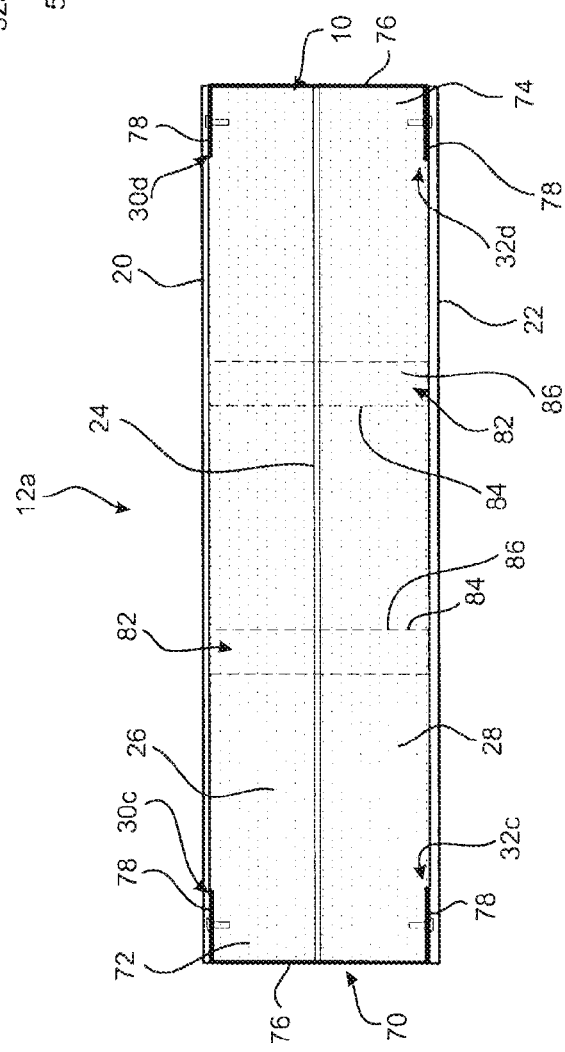

BUILDING PANEL, BUILDING SYSTEM AND METHOD OF CONSTRUCTING A BUILDING

CROSS-REFERENCE TO RELATED APPLICATIONS

This application is a continuation of U.S. application Ser. No. 13/505,952 filed May 3, 2012 which claims priority under 35 U.S.C. §371 of PCT International Application PCT/AU2011/001293, filed Oct. 11, 2011, and published under PCT Article 21(2) as WO 2012/048367 A1 on Apr. 19, 2012. PCT/AU2011/001293 claims priority from Australian application Nos. 2010904524 filed on Oct. 11, 2010, 2010904789 filed on Oct. 27, 2010, and 2011901478 filed on Apr. 20, 2011. This application is related to Australian application Nos. 2012201775 filed on Mar. 27, 2012 and 2012100346 filed on Mar. 27, 2012, which are divisional filings of PCT International Application PCT/AU2011/001293. The entire contents of each of the prior applications are herein incorporated by reference.

TECHNICAL FIELD OF THE INVENTION

A building panel and building system are disclosed for constructing a building. A method of constructing a building using the building panels and building system is also disclosed.

BACKGROUND ART

Third parties have proposed a building panel which comprises outer sheet members and an inner insulating panel disposed between the sheet members. However, as the thickness of such building panels increases the strength of the building panel significantly reduces to the extent that it becomes impractical to use building panels of this type for conventional building construction.

SUMMARY OF THE INVENTION

In accordance with a first aspect of the present invention, there is provided a building system comprising:
a building panel comprising first and second outer sheet members, an inner sheet member disposed between the first and second outer sheet members, and solid insulating material disposed between the first and second outer sheet members and the inner sheet member;
a first track member, the first track member and the building panel being arranged such that the panel is engagable along a first side with the first track member and the first track member is connectable to the first and second outer sheet members;
a second track member, the second track member and the building panel being arranged such that the panel is engagable along a second side with the second track member and the second track member is connectable to the first and second outer sheet members and the inner sheet member.

In one embodiment, the second track member comprises a first flange that extends adjacent to and parallel with the first outer sheet member when the second track member is engaged with the panel.

In one embodiment, the second track member comprises a second flange that extends adjacent to and parallel with the second outer sheet member when the second track member is engaged with the panel.

The second track member may comprise a third flange that extends adjacent to and parallel with the inner sheet member on a side nearest the first outer sheet member when the second track member is engaged with the panel.

The second track member may comprise a fourth flange that extends adjacent to and parallel with the inner sheet member on a side nearest the second outer sheet member when the second track member is engaged with the panel In one embodiment, one of the first and second outer sheet members is thicker than the other of the first and second sheet members.

In one embodiment, at least one of the first and second outer sheet members is substantially waterproof.

In one embodiment, at least one of the inner and outer sheet members is formed of cement fibre board material.

In one arrangement, the solid insulating material comprises rigid polyurethane (PU) foam material, for example of density about 45 $Kg/m^3$, or polyisocyanurate (PIR) or expanded polystyrene material (EPS).

In one embodiment, the second and/or first track members are formed of steel material.

In one embodiment the system comprises a side track member, the side track member and the building panel being arranged such that the side track member is engagable with a third side of the building panel between the first track member and the second track member.

In one embodiment the side track member is configured to be engagable with each of two laterally adjacent building panels.

In one embodiment the panel comprises first and second slots extending along each of the first and second sides of the panel to receive the first and second track members, the first slot being at an interface between the first outer sheet member and the insulating material, and the second slot being at an interface between the second outer sheet member and the insulating material.

In one embodiment the panel comprises a third slot extending along the second side being at an interface between the inner sheet member and the insulating material on a side of the first outer sheet member.

In one embodiment the panel comprises a fourth slot extending along the second side being at an interface between the inner sheet member and the insulating material on a side of the second outer sheet member.

In one embodiment the first and second sides are opposite each other.

In one embodiment the first side is a lower side and the first track member is a lower track member; and the second side is an upper side and the second track member is an upper track member.

In one embodiment the second track member comprises an outer second track member engagable with the panel and a connecting member connectable or engagable with the inner sheet member. The connecting member is further connectable to the outer second track member.

In one embodiment, the connecting member has a substantially U-shaped transverse cross sectional shape. The U-shaped member may be elongate. With this embodiment, the connecting member may comprise leg portions arranged to receive the inner sheet member there between so as to connect the connecting member to the inner sheet member and thereby connect the inner sheet member to the second track member.

In one embodiment, the first track member is further arranged to connect to the inner sheet member.

In accordance with a second aspect of the present invention, there is provided a building panel for use in a building system comprising first and second track members and building panels disposed there between, the building panel comprising:
- a first outer sheet member;
- a second outer sheet member;
- an inner sheet member disposed between the first and second outer sheet members; and
- solid insulating material disposed between the first and second outer sheet members and the inner sheet member;
- the building panel being configured so that the building panel is receivable in a first track member and receivable in an second track member; and
- the building panel being arranged such that the second track member is engagable with the inner sheet member and at least one of the first and second outer sheet member.

In accordance with a third aspect of the present invention, there is provided a building panel for use in construction of a building, the building panel comprising:
- a first outer sheet member;
- a second outer sheet member;
- an inner sheet member disposed between the first and second outer sheet members; and
- solid insulating material disposed between and bonded to the first and second outer sheet members and the inner sheet member;
- the building panel being provided: along a first side with first and second slots each extending for a length of the first side, the first slot being at an interface between the first outer sheet member and the insulating material, and the second slot being at an interface between the second outer sheet member and the insulating material; and, along a second side with first, second, third and fourth slots each extending for a length of the second side, the first slot of the second side being at an interface between the first outer sheet member and the insulating material, the second slot of the second side being at an interface between the second outer sheet member and the insulating material, the third slot being at an interface between the inner sheet member and the insulating material on a side of the first outer sheet member, and the fourth slot being at an interface between the inner sheet member and the insulating material on a side of the second outer sheet member.

In one embodiment the building panel comprises, along a third side which extends between the first and second sides: first and second slots each extending for a length of the third side, the first slot of the third side being at an interface between the first outer sheet member and the insulating material, and the second slot of the third side being at an interface between the second outer sheet member and the insulating material.

In one embodiment the building panel comprises, along a fourth side which extends between the first and second sides opposite the third side: first and second slots each extending for a length of the fourth side, the first slot of the fourth side being at an interface between the first outer sheet member and the insulating material, and the second slot of the fourth side being at an interface between the second outer sheet member and the insulating material.

In one embodiment the first slots are co-joined to form a continuous first slot about the building panel. Similarly the second slots may be co-joined to form a continuous second slot about the building panel.

In accordance with a fourth aspect of the present invention there is provided a building panel for use in construction of a building, the building panel comprising:
- a first outer sheet member;
- a second outer sheet member;
- an inner sheet member disposed between the first and second outer sheet members; and
- solid insulating material disposed between and bonded to the first and second outer sheet members and the inner sheet member;
- the building panel having four sides between the first and second sheet members, and being provided with continuous first and second slots extending about the four sides of the panel with the first slot being at an interface between the first outer sheet member and the insulating material, and the second slot being at an interface between the second outer sheet member and the insulating material; and, along a one of the sides third and fourth slots each of which extend for a length of the one side, the third slot being at an interface between the inner sheet member and the insulating material on a side of the first outer sheet member, and the fourth slot being at an interface between the inner sheet member and the insulating material on a side of the second outer sheet member.

In accordance with a fifth aspect of the present invention, there is provided a method of constructing a building panel comprising:
- arranging a first outer sheet member, a second outer sheet member, and an inner sheet member in a mould in a substantially fixed mutually spaced apart relationship where the inner sheet member lies between the first and second outer sheet members, members; and,
- delivering liquid reactants into the mould which react to produce a rigid polymer between, and self bonded to, the first outer, second outer and inner sheet members.

In one embodiment the method comprises providing the inner sheet member with a plurality of holes enabling the liquid reactants to flow between opposite side of the inner member in the mould.

In one embodiment arranging the sheet members comprises: placing a plurality of spacers between: the first outer sheet member and the inner sheet member; and, the inner sheet member and the second outer sheet member.

In one embodiment arranging the sheet members comprises stacking the sheet members, one on top the other.

In one embodiment each spacer is provided in the form of a tube having open opposite ends and a peripheral wall provided with one or more through holes.

In one embodiment the liquid reactants form polyurethane, while in another embodiment the reactants form polyisocyanurate.

In accordance with a sixth aspect of the present invention, there is provided a building system comprising:
- a building panel comprising first and second outer sheet members, an inner sheet member disposed between the first and second outer sheet members, and solid insulating material disposed between the first and second outer sheet members and the inner sheet member;
- a first track member, the first track member and the building panel being arranged such that the panel member is engagable with the first track member;
- a second track member, the second track member and the building panel being arranged such that the panel is engagable with the second track member; and
- a connecting member configured such that the connecting member is engagable with the inner sheet member so as to connect the inner sheet member to the second track member.

In one embodiment, the connecting member is separate to and engagable with the second track member, for example by providing one of the second track member and the connecting member with a recess and configuring the other of the second track member and the connecting member so that at least a portion of the second track member or the connecting member is receivable in the recess.

In one embodiment, the connecting member has a substantially U-shaped transverse cross sectional shape. The U-shaped member may be elongate. With this embodiment, the connecting member may comprise leg portions arranged to receive the inner sheet member there between so as to connect the connecting member to the inner sheet member and thereby connect the inner sheet member to the second track member.

In an alternative embodiment, the connecting member is integral with the second track member.

In one embodiment, the system comprises a further connecting member configured such that the further connecting member is engagable with the inner sheet member so as to connect the inner sheet member to the first track member. The further connecting member may be separate to or integral with the first track member.

In a seventh aspect of the invention there is provided a method of constructing a building comprising:
providing a plurality of building systems according to the first aspect;
placing a layer of a water proof material on a slab of the building;
fixing one or more of the panel assemblies to the slab over the waterproof layer.

In one embodiment the method comprises
forming a corner of the building by standing two of the panels upright and abutting the panels together in respective intersecting planes to form a first angle between the two panels;
providing a corner joint member having a joint corner defining a joint angle, the corner joint member configured to engage one of the first or second sides of the two panels forming the building corner, the corner joint member further arranged to allow distortion of the corner joint member to vary the joint angle to conform with the first angle;
engaging the corner joint member with each of the two panels; and,
coupling the corner joint member with each of the two panels.

In one embodiment the method comprises:
arranging a first plurality of the panels to construct walls to form a lower story of a building;
constructing formwork to lie substantially flush with an uppermost surface of the lower story and extending partially across the first panels of the lower story;
pouring concrete onto the formwork to form upon setting, a suspended slab wherein a peripheral edge of the slab is supported on the first panels; and,
coupling a second plurality of further panels to the suspended slab to construct a wall of a second story.

In one embodiment the method comprises a rebating the second plurality of panels and arranging the rebated second panels on top of the first panels of the lower story with the rebates seating on or otherwise receiving the peripheral edge of the suspended concrete slab.

An eighth aspect of the invention provides a method of constructing a building comprising:
a plurality panel according to the third or fourth aspect;
connecting a first track member to a slab of the building;
engaging one or more of the panels in the first track;
connecting one or more panels to the first track with a plurality of mechanical fasteners that extend through one or both of the first and second outer sheet members;
engaging a second track with the second side of the one or more panels; and,
connecting the one or more panels to the second track with a plurality of mechanical fasteners that extend through the one or both of: the first outer sheet member and the inner sheet member; and, the second outer sheet member and the inner sheet member.

In one embodiment connecting the second track comprises connecting a first flange of the second track to the first sheet member with a first mechanical fastener, connecting a second flange of the second track to the second sheet member with a second mechanical fastener, connecting third flange of the second track to the inner sheet member with the first mechanical fastener, and connecting a fourth flange of the second track to the inner sheet member with the second mechanical fastener.

BRIEF DESCRIPTION OF THE DRAWINGS

The present invention will now be described, by way of example only, with reference to the accompanying drawings, in which:

FIG. 5 is a longitudinal cross section view of a building system and panel;

FIG. 7 is a transverse section view of the building system shown in FIG. 6;

FIGS. 15b-15e are representations of specific components where parts of the brace are shown in FIG. 15a;

DETAILED DESCRIPTION FOR CARRYING OUT THE INVENTION

Figure 1:
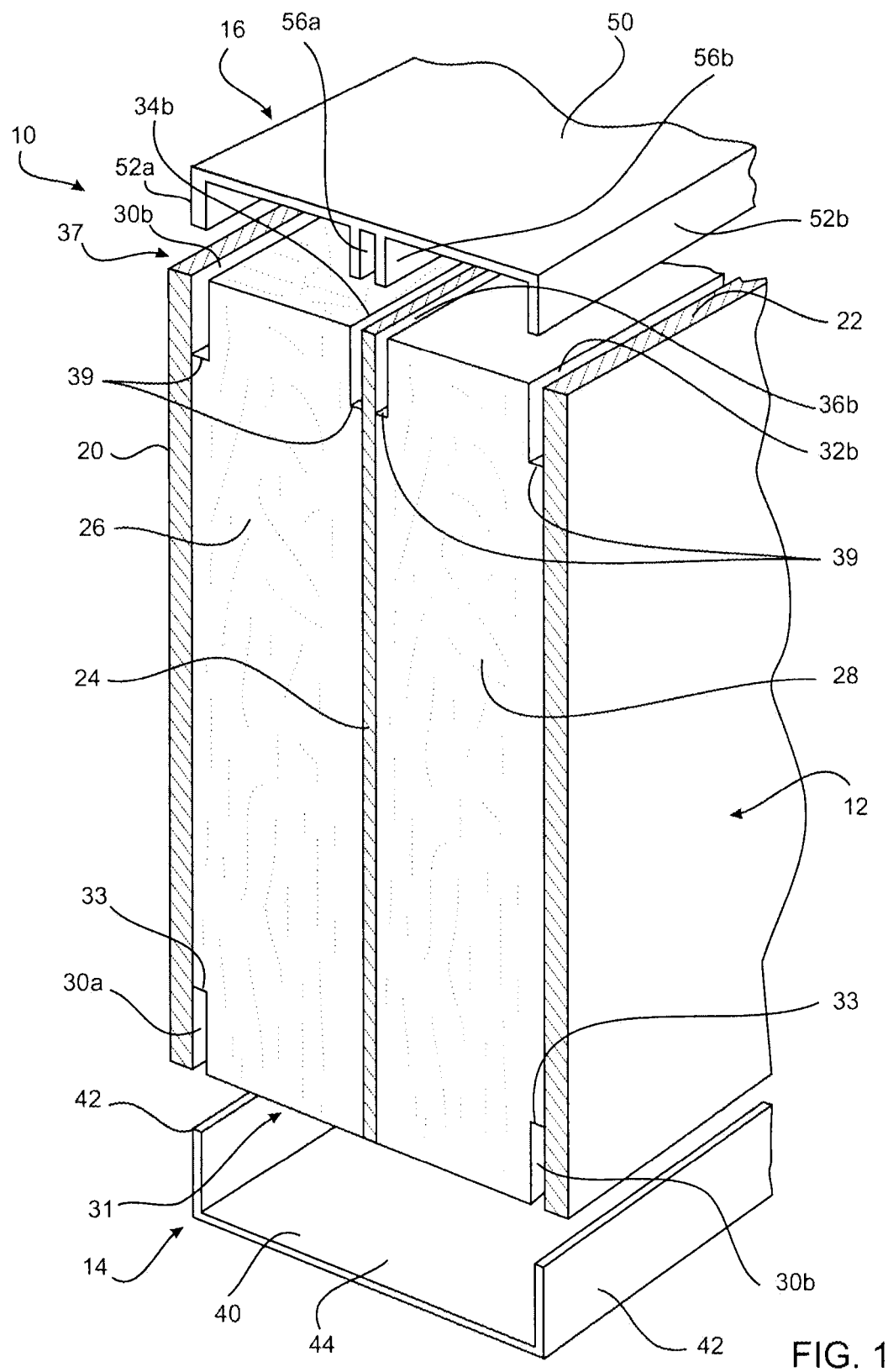
FIG. 1 is a diagrammatic representation of a building system according to an embodiment of the present invention.
Figure 2:
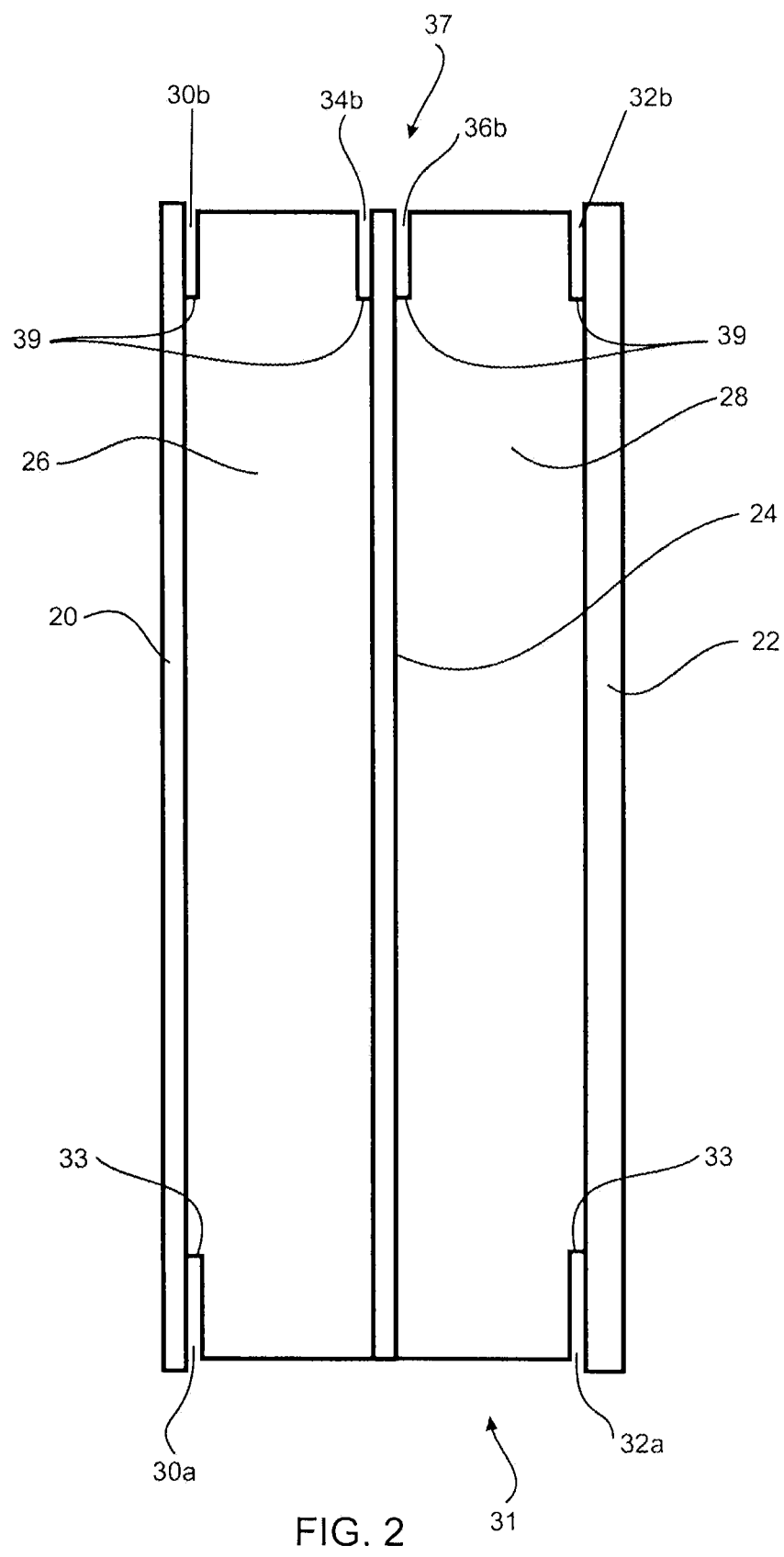
FIG. 2 is a section view of a panel incorporated in the system shown in FIG. 1.

Referring to the drawings and in particular FIG. 1, there is shown a building system 10 for use in constructing walls of a building.

The building system 10 comprises building panels 12 formed of sheet members and insulating material, first track members 14, and second track members 16. In this example the first track members 14 are lower track members in that they extend along a first or lower side of the panels 12 while the second track members 16 are upper track members in that they extend along a second or upper side of the panels 12. For ease of reference in this description the first track members will be referred to as lower track members 14 and the second track members will be referred to as the upper track members 16.

In this example, multiple building panels 12 and multiple upper and lower track members 14, 16 are provided with the multiple lower and upper track members 14, 16 disposed along a path of a desired wall in endwise relationship and multiple building panels disposed in endwise relationship between the lower and upper track members 14, 16 so as to define a wall.

Each building panel 12 comprises a first outer sheet member 20 intended during use to face inwardly of a building wall, a second outer sheet member 22 intended during use to face outwardly of a building wall, and an inner sheet member 24 disposed between the first and second outer sheet members 20, 22.

Examples of the materials from which sheets 20, 22 and 24 may be made include, but are not limited to, fibre cement board, wood sheets for example pine sheets; plaster board, Colorbond, MGL (magnesium oxide) board and composite materials. Further, in various embodiments, different materials may be used for respective sheets 20, 22 and 24 in any particular panel 12.

Also in the present example, since the second outer sheet member 22 is intended to face outwardly of a building and may as a consequence become exposed to ambient moisture, the second outer sheet member 22 is configured so as to be waterproof. In addition, in this example, the second outer sheet member 22 is thicker than the first outer sheet member 20 and the inner sheet member 24. In one embodiment, the first outer sheet member 20 and the inner sheet member 24 are approximately 4.5 mm thick and the second outer sheet member 22 is 6 mm thick.

Each building panel 12 also comprises multiple cores, in this example first and second cores 26, 28, each of which is disposed between the inner sheet member 24 and one of the outer sheet members 20, 22. Thus panel 12 can be considered to be a two or dual core panel. Each of the first and second cores 26, 28 is formed of solid insulating material, such as a rigid polymer and more particularly a rigid thermosetting polymer such as in this example rigid polyurethane (PU) foam material. In one example the PU may have a density of approximately 45 Kg/m$^3$. Such material has good fire retardant properties, including a high flash point of the order of 300° C. However, it will be understood that other insulating material is envisaged such as polyisocyanurate (PIR) or expanded polystyrene material (EPS) may be used.

The sheet members 20, 22, 24 may be fixed to the cores 26, 28 in any suitable way, for example by adhesives or thermal bonding. Indeed thermal bonding may occur as self bonding arising from the inherent properties of the rigid insulating material.

A first slot 30a and a second slot 30b extend along a first or lower side 31 of the panel. The first slot 30a is at an interface between the first outer sheet member 20 and the insulating material 26. The second slot 32a is at an interface between the second outer sheet member 22 and the core 28. The slots 30a and 32a create internal shoulders 33 in the cores 26, 28.

A first slot 30b, second slot 32b, third slot 34b and fourth slots 36b each extend along and for the length of a second side or upper side 37 of the panel 12. The second side 37 is opposite the first side. The first slot 30b is at an interface between the first outer sheet member 20 and the core 26, the second slot 32b is at an interface between the second outer sheet member 22 and the core 28, the third slot 34b is at an interface between the inner sheet member 24 and the 26 on a side of the first outer sheet member 20, and the fourth slot 36b is at an interface between the inner sheet member 24 and the core 28 on the side of the second outer sheet member 22.

The slots 30b, 32b, 34b and 36b form respective internal shoulder 39 near the second side 37 of panel 12.

In the present example, the thickness of the building panel 12 is approximately 90.8 mm, although any suitable building panel thickness is envisaged, such as any thickness in the range 70 mm to 250 mm.

Each lower track member 14 includes a base plate 40 and two substantially parallel elongate ribs or flanges 42 defining a lower channel 44 there between.

The lower channel 44 and the slots 30a and 32a are configured such that the building panel 12 is engagable with the first or lower track member 14 by receiving the flanges 42 the slots 30 a and 32a. Moreover as will be explained in greater detail later, the lower track 14 is connected to the panel 12 by mechanical fasteners that pass through the first and second outer sheets 20, 22 and respective adjacent flanges 42.

Figure 3:
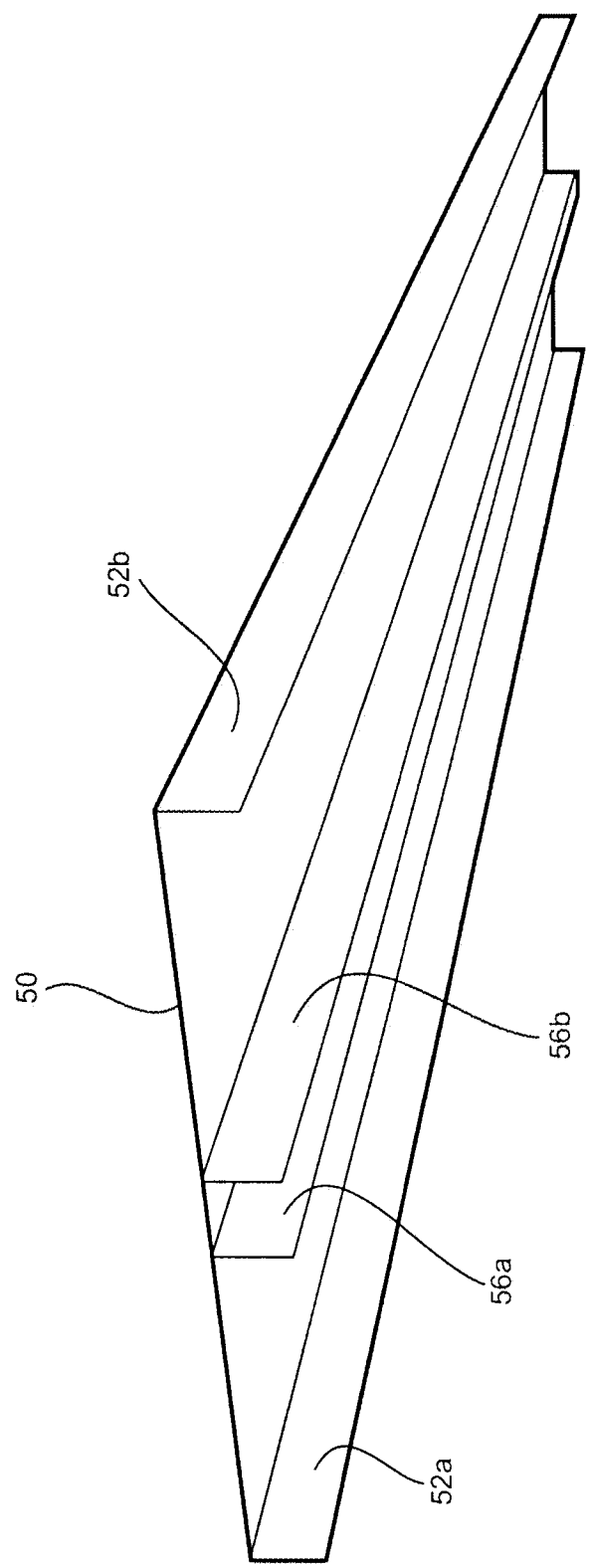
FIG. 3 is a diagrammatic perspective view of an upper track member of the building system shown in FIG. 1.

With reference to FIGS. 1 and 3 each second or upper track member 16 includes a base plate 50 and two substantially parallel outer first and second elongate ribs or flanges 52a and 52b (referred to in general as "flanges 52") defining an upper channel 54 there between. Upper track member 16 also includes a third flange 56a and a fourth flange 56b (referred to in general as "flanges 56").

The flanges 56 are spaced apart by distance marginally greater than the thickness of inner sheet 24 so as to seat in slots 34b and 36b and closely fit over a second or upper portion inner sheet 24 when the upper track 16 is engaged with panel 12. More particularly the flanges 56 lie adjacent to and parallel with opposite sides of the inner sheet 24. Of course at this time the flanges 52 seat in slots 30b and 32b and thus lie adjacent to and parallel with first and second outer sheets 20 and 22 respectively.

As will be explained in greater detail later, the upper track 16 is connected to the panel 12 by mechanical fasteners that pass through the first and second outer sheets 20, inner sheet 22 and flanges 52 and 56. This mechanically connects the first and second outer sheets 20, 22 to the inner sheet 24 outer and is believed to provide enhanced panel compression strength as well as panel integrity.

The upper and lower tracks 14, 16 may be formed of steel material, although it will be understood that other suitably strong materials are envisaged. It is envisaged that each of the tracks 14 and 16 is formed as respective integral stock (for example respective continuous extrusions) and cut to a required length.

Figure 4:
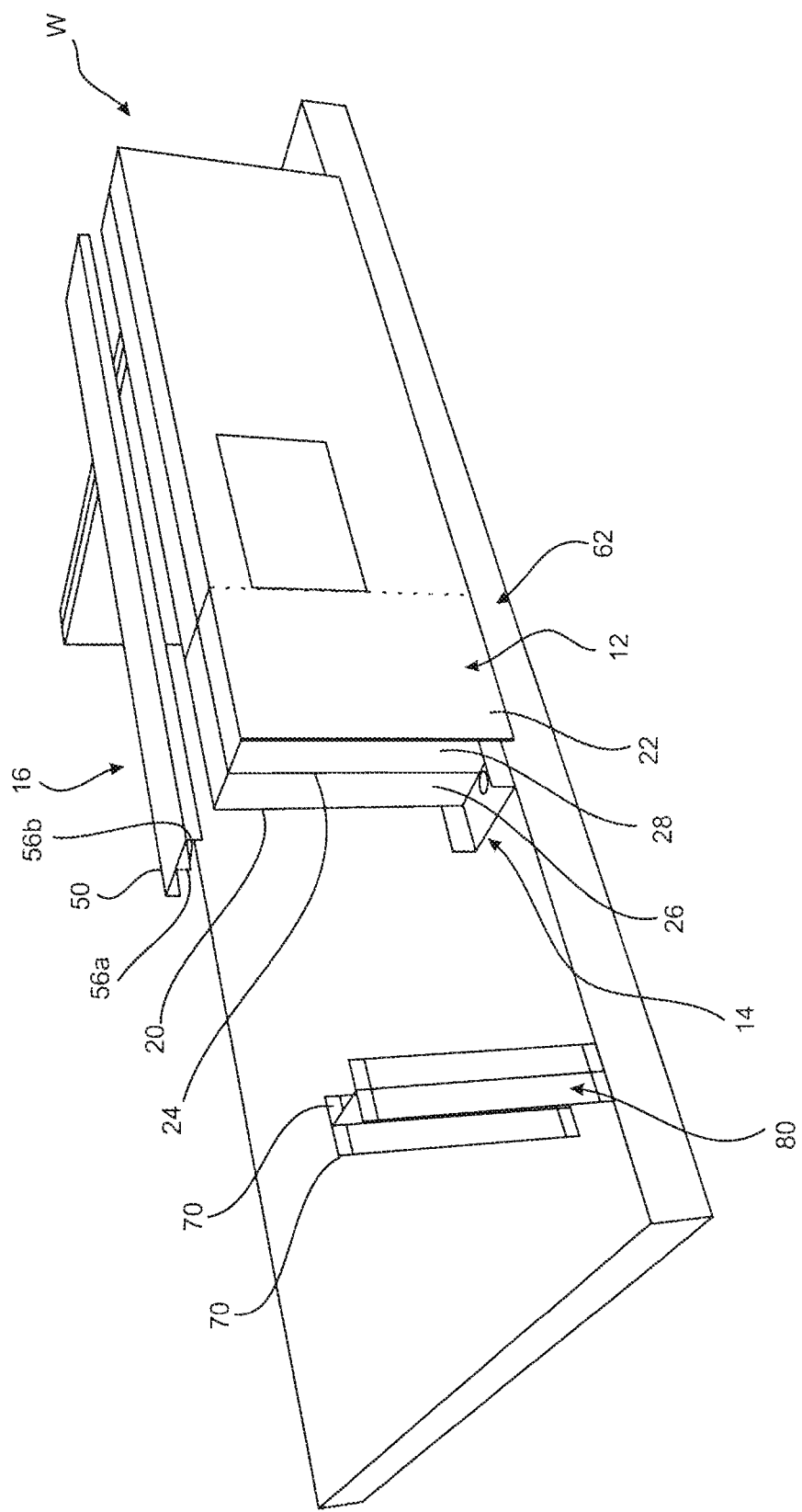
FIG. 4 is schematic representation of a use of the building system to construct a building.
Figure 6:
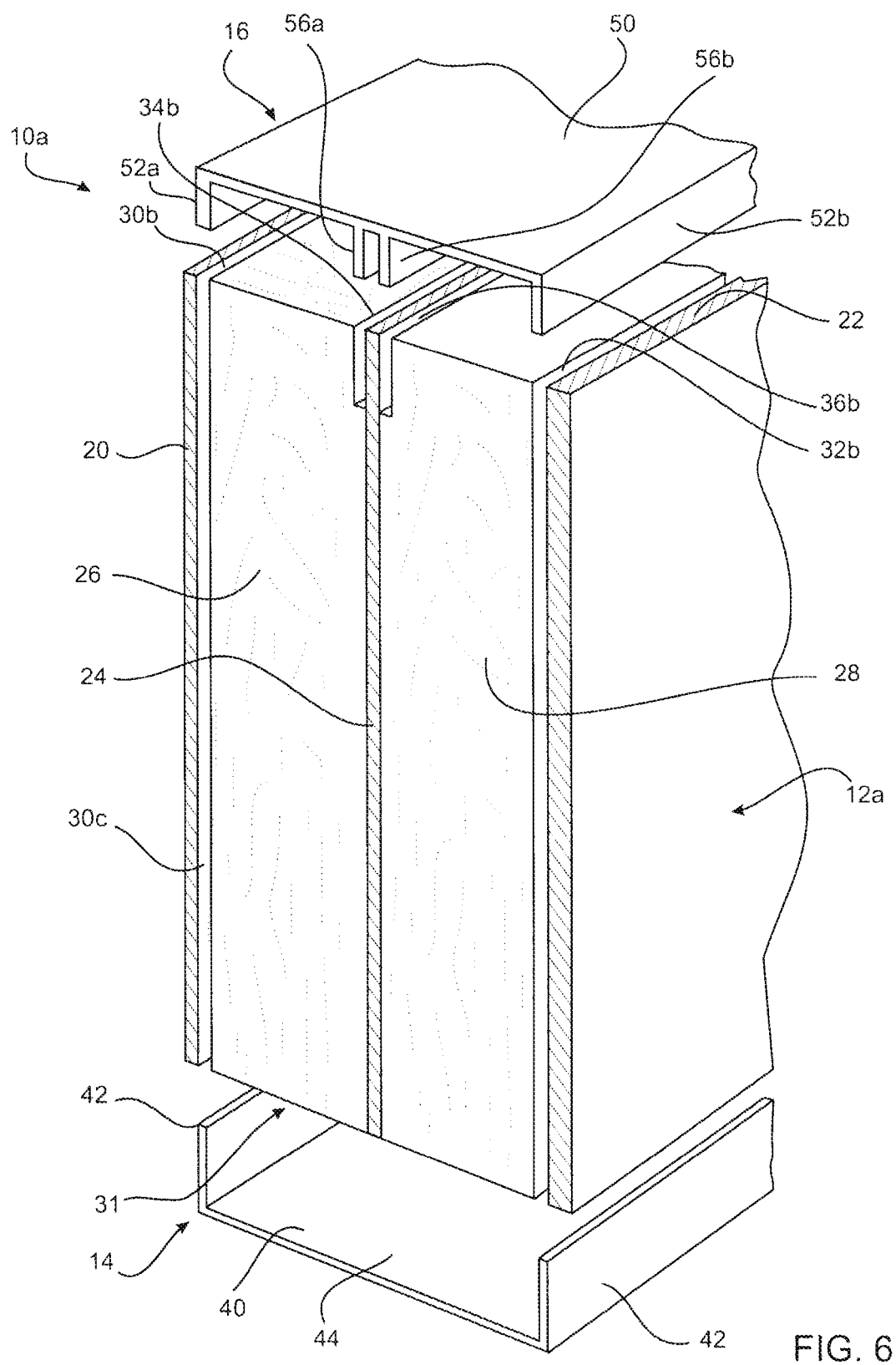
FIG. 6 is a schematic representation of a second embodiment of a building system and panel in accordance with the present invention.

With reference to FIGS. 4 and 5 in order to construct a wall W, a user first fixes a lower track member 14 to a foundation of a proposed building, such as a concrete slab 62, in any suitable way. One or more building panels 12 are then engaged with the lower track members 14 by receiving the flanges 42 of the lower track members 14 in the slots 30a, 30b in the first or lower side 31 of the panels 12.

The building panels 12 are fixed to the lower track members 14 in any suitable way, for example mechanical fasteners such as screws 64. The screws 64 are driven through the first and second outer sheets 20, 22 into and through the respective adjacent flanges 42 and cores 26, 28. The screws may be chosen to be of a length that does not penetrate to the inner sheet 24. Although they may also be of sufficient length to extend through the inner sheet 24.

An upper track 16 is then engaged with the building panels 12 in the lower track 14 by receiving the flanges 52 and 56 into the slots 30b, 32b; and slots 34b and 36b, respectively. The building panels 12 are then fixed to the upper track members 16 in any suitable way, for example mechanical fasteners such as screws 66. The screws 66 are driven through the first and second outer sheets 20, 22 into and through the respective adjacent flanges 42 and cores 26, 28. The screws are chosen to be of a length that does also penetrate at least the closest of the flanges 56 and the inner sheet 24. However the screws 66 may be of a length that extends through either of the first and second outer sheets and the inner sheet 24. For example in FIG. 5 one screw 66 is shown passing through first sheet 20, adjacent flange 52a, core 26, flange 56a, inner sheet 24 and opposite adjacent flange 56b. Another screw 66 is shown passing through second sheet 22, adjacent flange 52b, core 28, flange 56b, inner sheet 24 and opposite adjacent flange 56a.

Roof trusses and frames may then be coupled to the upper track 16 to further the construction of a building.

FIGS. 6-9 illustrate a second embodiment of a building system 10a and corresponding building panels 12a in accordance with the second embodiment of the invention. In the following description features which correspond either in structure or function to those of the first embodiment are denoted with the same reference. The building system 10a and the building panels 12a are substantially the same as building system 10 and panels 12. The substantive differences between the system 10a and panels 12a and the system 10 and panels 12, in brief, comprise: the inclusion of side track members 70; the provision of first and second slots 30c, 32c along a third side 72 of panel 12a, and the provision of first and second slots 30d, 32d along each of an opposite fourth side 74 of panel 12a. The slots 30c, 32c; and 30d, 32d accommodate the side track members 70.

The side track members 70 facilitate lateral or side-to-side coupling between adjacent panels 12a. The side track members 70 are in essence of the same or similar form and construction as lower track members 14.

Figure 8:
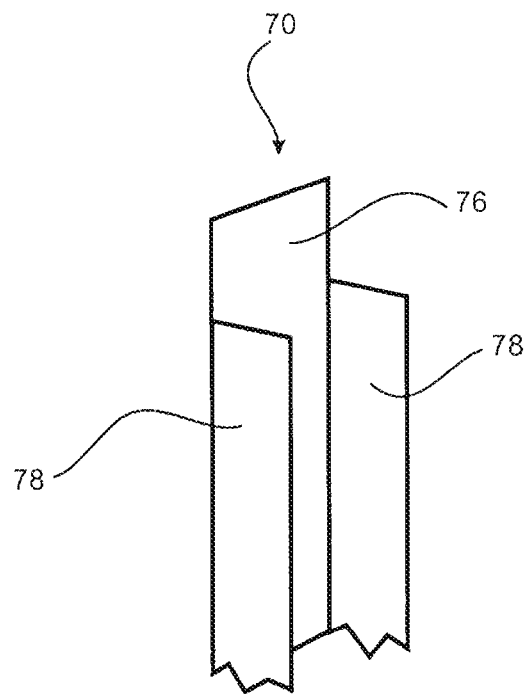
FIG. 8 is a schematic representation of a side connector or track for the building system shown in FIGS. 6 and 7.

Side track members 70 are in the form of u-shaped steel extrusions having a central base plate 76 and flanges 78 extending in the same direction from opposite longitudinal sides of the base plate 76. However, as shown in FIGS. 7 and 8, a portion of the flanges 78 near each end of side track member 70 is cut away in order to accommodate the flanges of upper track member 16 and lower track member 14.

The first slots 30c and 30d are formed along the length of each of the sides 72 and 74 and at an interface between first outer sheet member 20 and insulating layer 26. The second slots 32c and 32d are formed along the length of each of the sides 72 and 74 and at an interface between second outer sheet member 22 and insulating layer 28.

More particularly the first slots 30a, 30b, 30c and 30d are co-joined to form a continuous first slot 30 about the panel 12a. Likewise the second slots 32a, 32b, 32c and 32d are co-joined to form a continuous second slot 32 about the panel 12a.

Figure 9:
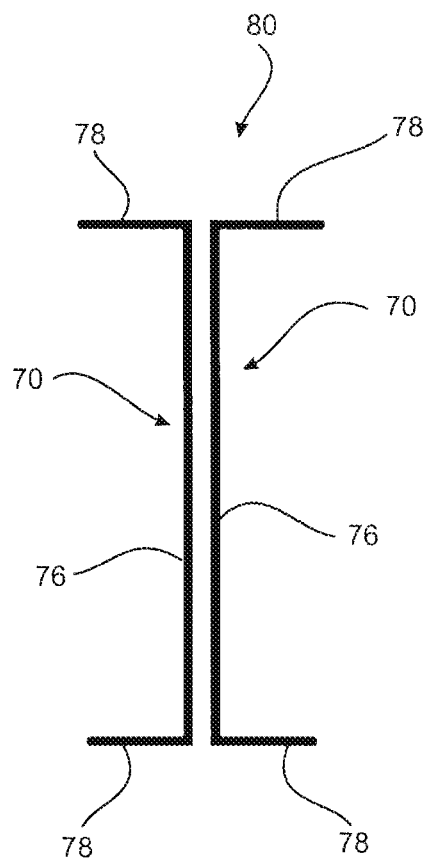
FIG. 9 is an end view of a side connector incorporated in the building system shown in FIG. 6.

In order to enable lateral coupling of adjacent panels 12a together along their longitudinal sides, pairs of side track members 70 may be connected together back-to-back to form lateral connectors 80 as depicted in FIGS. 4 and 9. In FIG. 9 the respective side track members 70 which form the lateral connector 80 are depicted as being slightly spaced apart however this is for ease of representation only. In practice, the base plates 76 of side track members 70 would be in contact with each other and attached together by way of a plurality of mechanical fasteners or spot welding. Each side track member 70 is attached to its corresponding panel 12a by a plurality of screws which pass through first and second outer sheet members 20 and 22 in a similar manner to that described and depicted in relation to the upper and lower track members 14 and 16.

In order to manufacture a panel 12 or 12a, the sheet members 20, 22 and 24 are arranged within a mould in a substantially fixed mutually spaced apart relationship, and liquid reactants for example as required to form polyurethane or polyisocyanurate are delivered or injected into the mould. The reactants when reacting expand and fill the space or void between the sheet members and, due to their inherent properties, self bond to the sheet members. In order to hold the sheet members in the fixed spaced apart relationship, a plurality of spacers 82 (shown in FIG. 7) are used between respective adjacent sheets. In this particular example, the spacers 82 are in the form of PVC tubes which are open at each opposite axial end and have a circumferential wall 84 provided with a plurality of through holes 86. During the manufacturing process, the sheet members are arranged in an overlying juxtaposition and spaced apart by the spacers 82. For example, first outer sheet member 20 may be first placed in a mould, then a plurality of spacers 82 placed on the first outer sheet member 20; inner sheet 24 is then placed on top of the spacers 82; a further plurality of spacers 82 is supported on inner sheet 24; and, finally second outer sheet 22 is placed on the spacers. The mould is then closed preventing motion of the sheet members away from each other and the liquid reactants delivered into the mould. To assist further in the manufacturing process a plurality of through holes may be formed in the inner sheet 24 prior to placing in the mould. The holes enable liquid reactants and the forming rigid polymer to pass through the holes to equalise pressure on opposite sides of sheet 24 preventing warping or fracturing that may otherwise arise due to high pressures generated in the manufacturing process.

The slots formed in the panels 12, 12a to accommodate the track members may be formed by use of cutting instruments which cut the slots to the desired depth about the sides of the panel 12, 12a.

The resulting panel 12, 12a forms a structural or load bearing panel which may be used, for example, in place of bricks or concrete panels in the construction of buildings.

A method of constructing a two story building 100 utilising a plurality embodiments of panel systems and in panels will now be described with reference to FIGS. 10-15e. Building 100 comprises concrete slab or pad 62 which in one example may have a thickness of 70 mm to 150 mm. The slab 62 is laid on foundations (not shown). An outer wall of building 100 is constructed from modified panels 12b (see in particular FIG. 10). The modified panels 12b differ from the panels 12a described hereinabove by forming an outer sheet 22 with an extended edge 102 that extends beyond the corresponding edge of outer sheet 20 so that when panel 12b is fixed to the slab 62, the edge 102 lies below upper surface 104 of slab 62 to form a recess or pocket 106 between a vertical side face 108 of slab 69 and the sheet 22. Panels 12*a* are used to construct internal walls of the building 100.

In order to provide waterproofing to the building 100 and in particular between the slab 62 and panels 12*b*, a layer of waterproof material 110 is placed on slab 62 beneath the panels 12*b* which form the outer peripheral wall of building 100. The waterproof layer 110 is configured and arranged so that the panels 12*b* are fixed to the slab over the layer 110 as shown most clearly in FIG. 10. The waterproof layer 110 may be in the form, for example, of building paper. Thus during construction of the building 100, the building paper 110 is laid on the slab 62 prior to attachment of the lower or bottom track 14. Track 14 is then fixed to the slab 62 by use of appropriate fasteners such as, for example, chemical anchors 112. Building panels 12*b* are then seated in the bottom track 14 and fixed thereto in the manner described hereinabove.

The waterproof layer 110 is configured and arranged in this embodiment so as to extend beyond the slab 62 and turn or curve down into the pocket 106 abutting an inside surface 114 of sheet 22.

Figure 10:
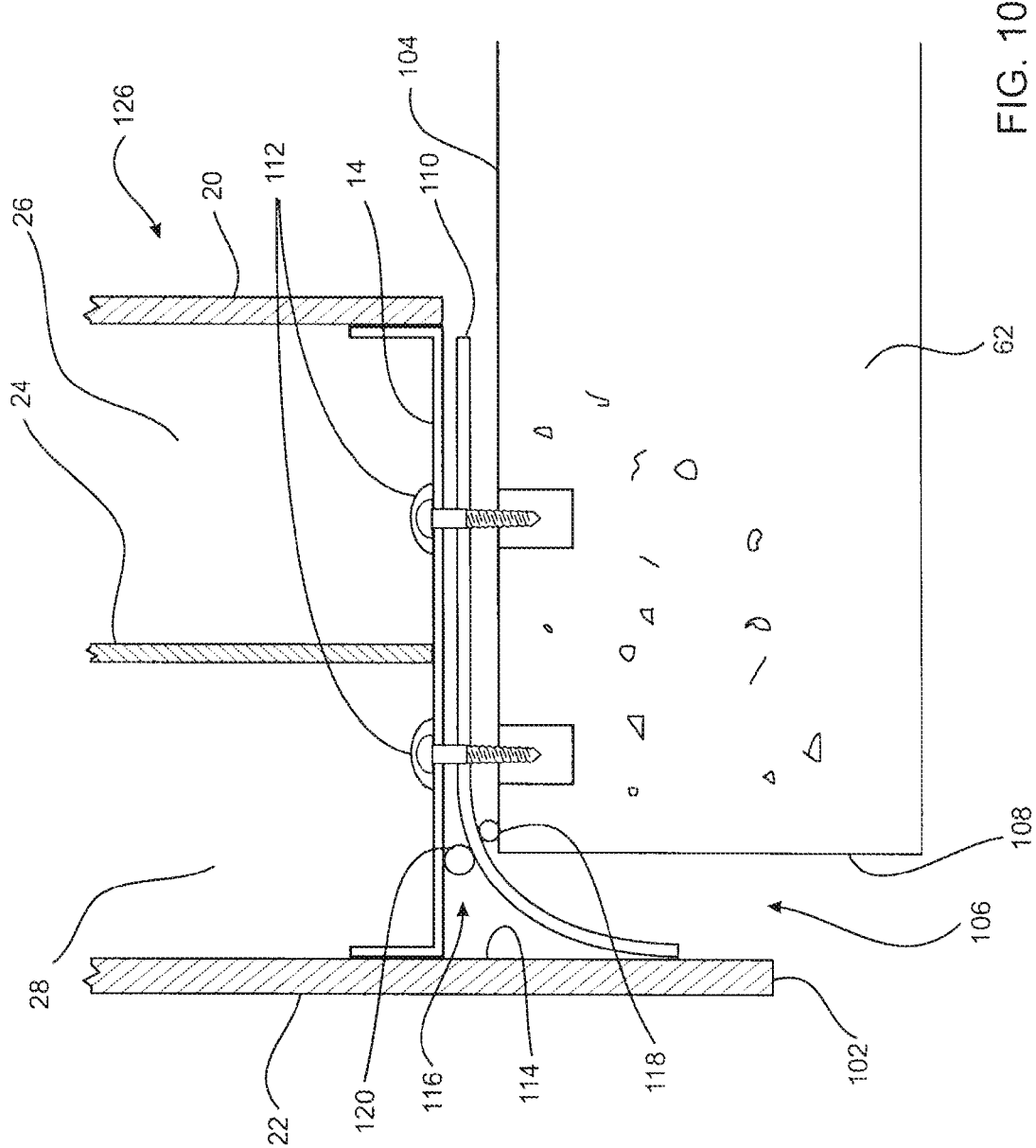
FIG. 10 is a schematic representation of a third embodiment of a building panel and system in accordance with the present invention.
Figure 11:
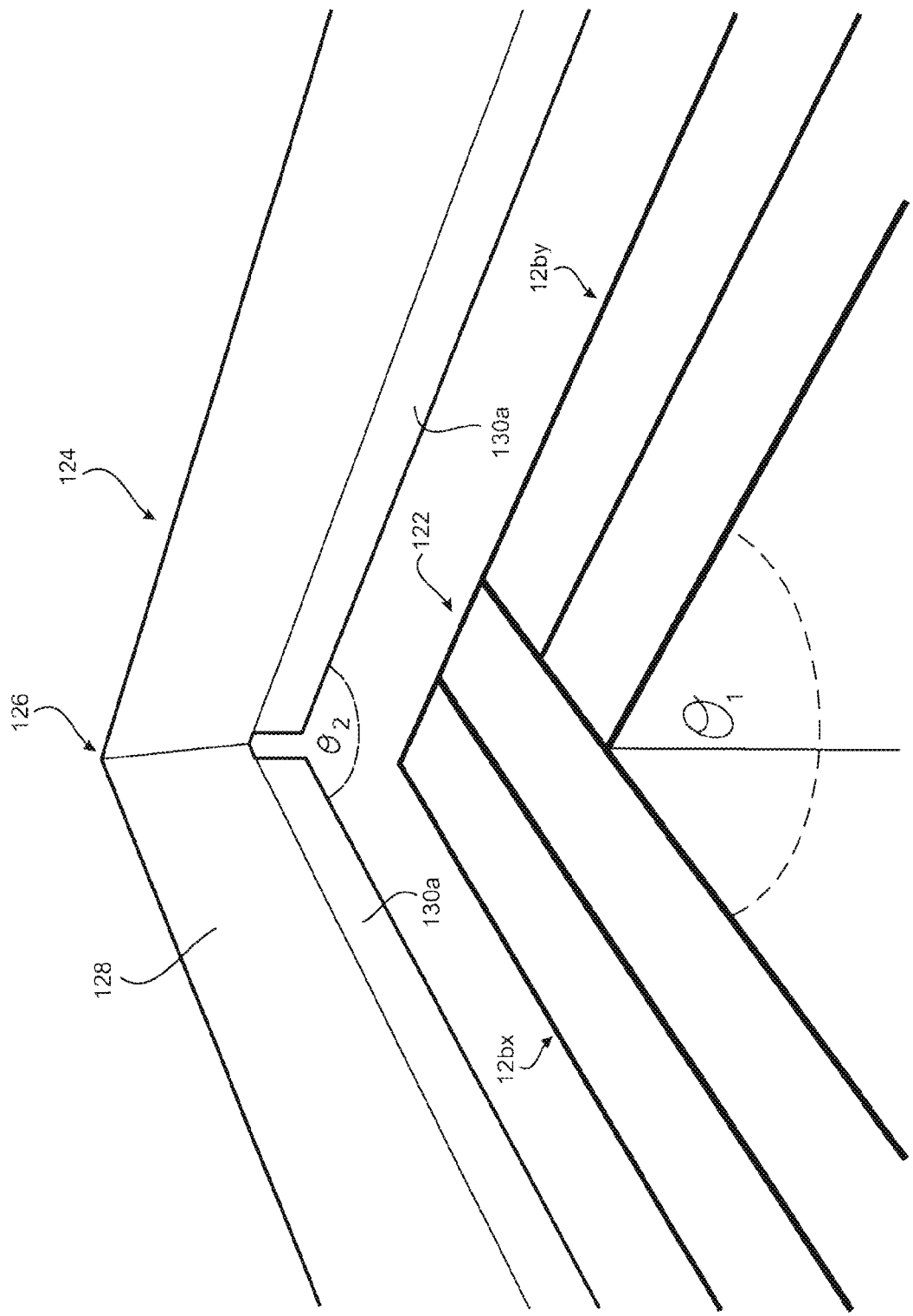
FIG. 11 is a schematic representation from the top of a corner connector utilised in embodiments of the building system.

As shown in FIG. 10 waterproofing of building 100 is enhanced by the provision of sealant 116 between lower tracks 14 and slab 62. In this embodiment, sealant 116 is provided as two beads 118 and 120 of settable sealant material. First bead is 118 provided between the waterproof layer 110 and slab 62. The second bead 140 of settable sealant material is provided between the waterproof layer 110 and the lower track 14. In this particular embodiment, the sealant beads 118 and 120 are laterally offset from each other.

It would be appreciated that any water entering the pocket 106 is stopped from passing between panels 12*a* and slab 62 by way of the waterproof layer 110 and the sealant 116 and moreover sealant beads 118 and 120. Further, any moisture in slab 69 is isolated from bottom track 14 by way of the waterproof layer 110.

When constructing a building 100, a corner 122 (see FIG. 11) is formed by standing two panels 12*bx* and 12*by* upright and abutting the panels together in respective intersecting planes. In this particular example, the intersecting planes are at first angle $\theta_1$ which is intended to be a right angle. In order to provide stability and facilitate the coupling of the panels 12*bx* and 12*by* at the corner 122, a corner joint member 124 is provided. The corner joint member 124 is configured to form a corner 126 having a corner angle $\theta_2$. Corner joint member 124 engages both the panels 12*bx* and 12*by* about the corner 122. Moreover, corner joint member 124 is configured to allow it to distort or flex in order to vary the joint corner angle $\theta_2$ to conform or match with the first angel $\theta_1$. This in effect provides a degree of give or compliance allowing the coupling of the joint member 124 to the underlying panels 12*bx* and 12*by*.

Figure 12:
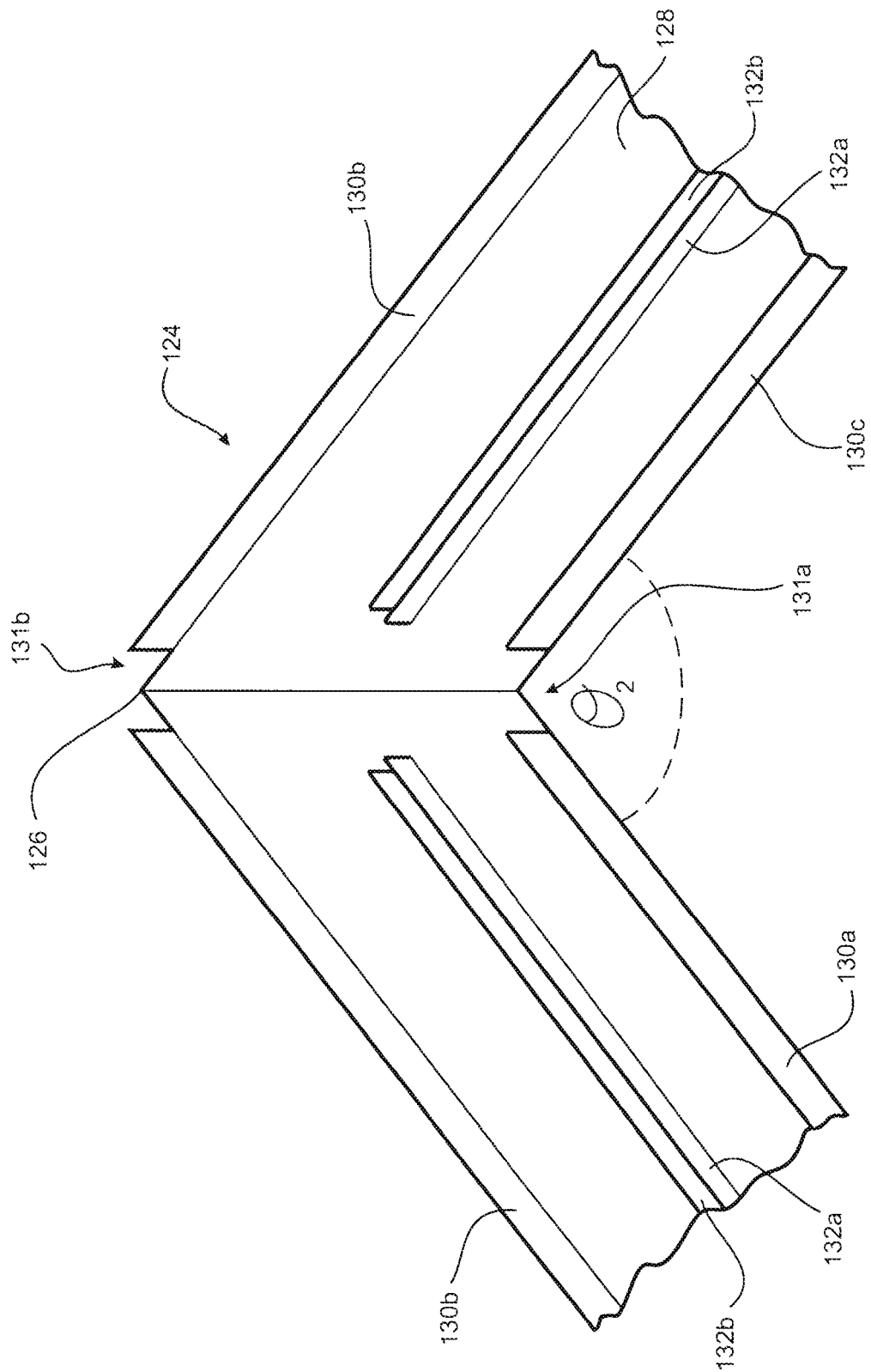
FIG. 12 is a schematic representation from the bottom of the corner connector shown in FIG. 11.

Corner joint member 124 comprises a base plate 128 from which depends outer longitudinal flanges 130*a* and 130*b* (see in particular FIG. 12). As is apparent from FIG. 12, a discontinuity 131*a* is formed in the flange 130*a* about the corner 126 and a discontinuity 131*b* is formed in the flange 130*b* about corner 126. These discontinuities enable flexing of the corner joint member 124 in the plane of plate 128 to allow the member to seat in the panels 12*bx* and 12*by*.

The corner joint member 124 is also provided with intermediate pairs of spaced apart flanges 132*a* and 132*b* that are arranged and configured to seat in slots 34*b* and 36*b* on opposite sides of inner sheet 24 in the corner panels 12*bx* and 12*by*.

As may be apparent from the above description the corner joint member 124 in effect comprises two lengths of upper cap or track 16 with ends joined to form corner angle $\theta_2$ but with adjacent portions of the walls or flanges 52*a* and 52*b* on opposite sides of corner 126 being removed so as to form discontinuities or spaces 131*a* and 131*b*.

Corner joint panel 124 is coupled to the corner panels 12*bx* and 12*by* in the same manner as described hereinabove in relation to the upper track 16.

Due to their construction, the panels 12, 12*a*, and 12*b* (referred to in general as "panels 12") have substantial compressive and load bearing strength. For example, panels 12 of a thickness of between 210 mm and 250 mm and have been tested to withstand a compressive load of 25 tons. This enables multi-story buildings with suspended concrete floors to be constructed from embodiments of panels 12.

Figure 13:
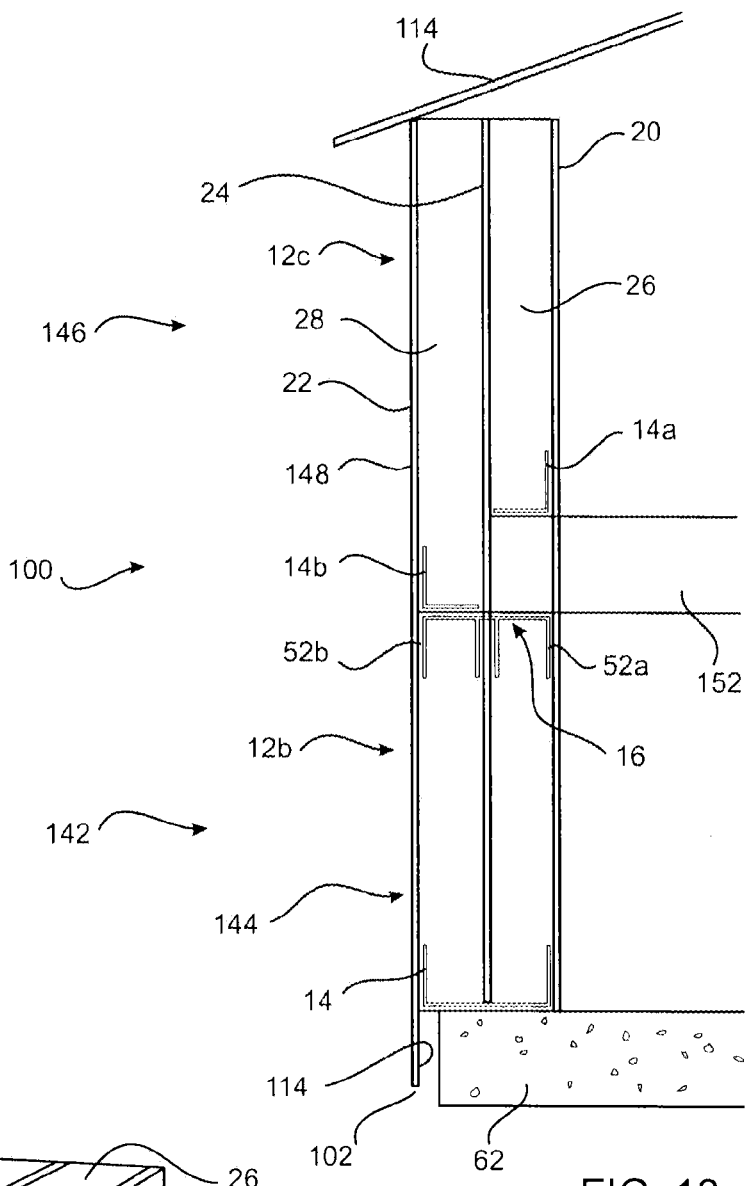
FIG. 13 is a cross section view of a portion of a two story building constructed utilising embodiments of the building system and panels.
Figure 14:
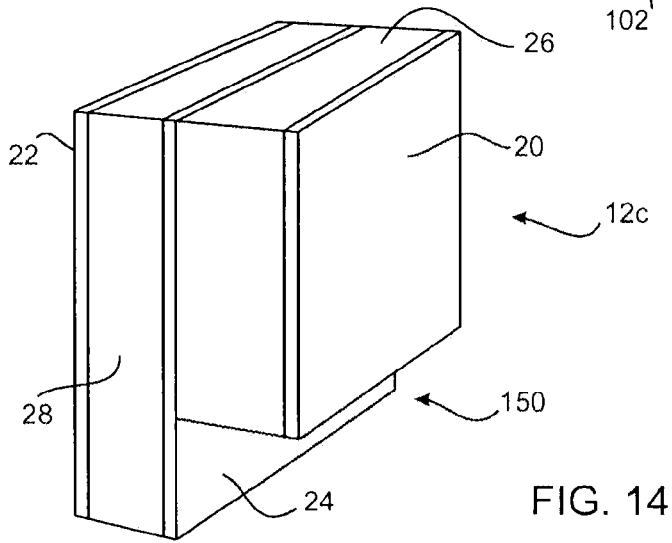
FIG. 14 is a schematic representation of a further embodiment of a building panel in accordance with the present invention.
Figure 15A:
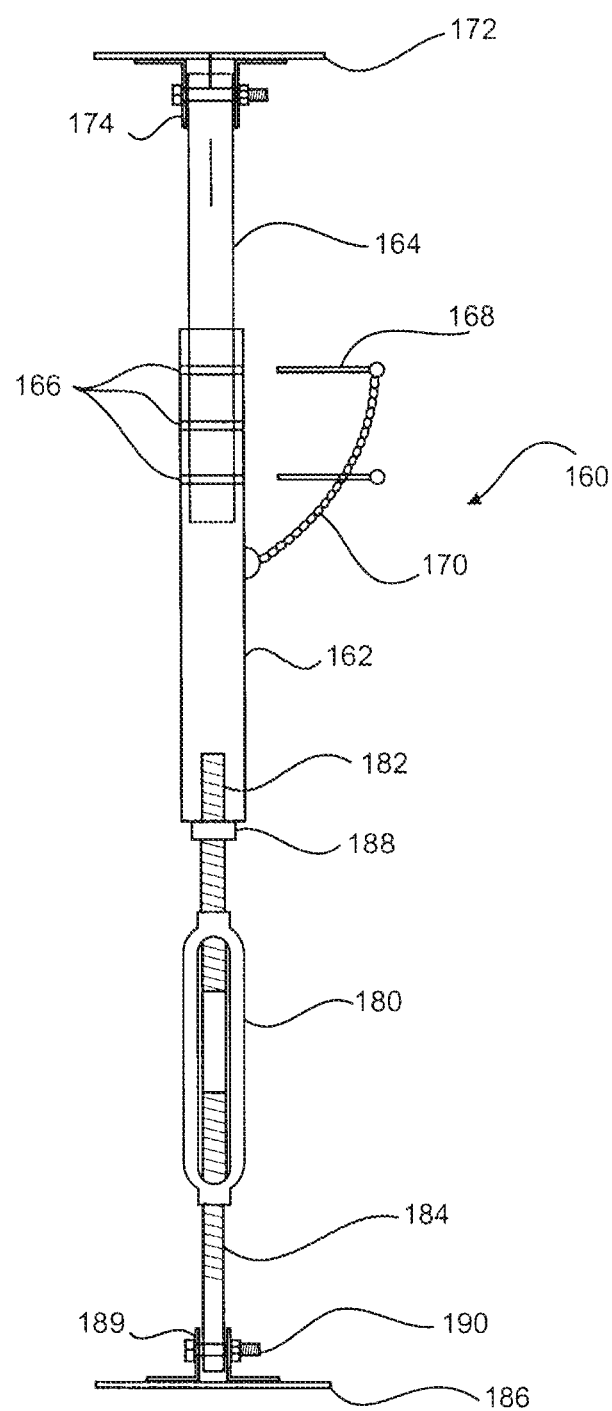
FIG. 15a is a representation of a brace incorporated in a method of constructing a building in accordance with the present invention.
Figure 15B:
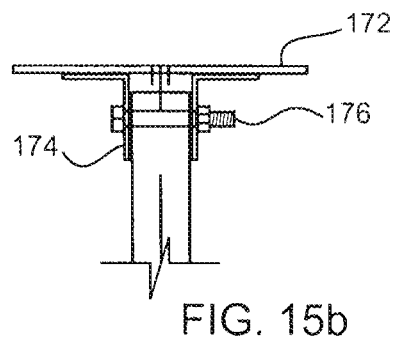
Figure 15C:
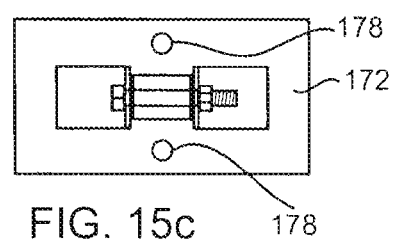
Figure 15D:
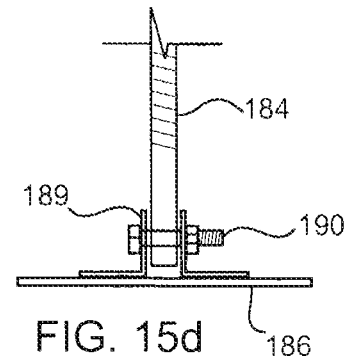
Figure 15E:
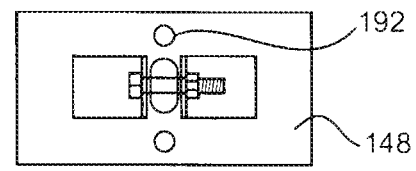

FIG. 13 illustrates a portion of the two story building 100 constructed from a plurality of panels 12. Building 100 has a lower story 142 having a peripheral (or outer) lower story wall 144 made from a plurality of panels 12*b*. The panels 12*b* are coupled to an underlying slab 62. Slab 62 may be a ground level slab, or indeed a slab of a higher story. A second story 146 of building 100 has an upper story peripheral wall 148 comprising a plurality of panels 12*c* which are supported on underlying panels 12*b*. The panels 12*c* differ from the panels 12*a* (shown in FIGS. 6 and 7) by the provision of a longitudinal rebate 150 along bottom edge of panel 12*c* from the sheet 20 to a depth to expose the inner sheet 24. Thus a portion of the sheet 20 and core 26 are removed to expose inner sheet 24. When the upper story wall 148 is placed on top of the lower story wall 142, the rebate 150 forms a continuous ledge or seat for supporting a suspended concrete slab 152.

Building system 10*c* corresponding to the panel 12*c* further differs from the building system of panel 12*a* by the replacement of bottom cap or track 14 with two right angle tracks 14*a* and 14*b*. The tracks 14*a* and 14*b* may be considered to be a track 14 which is cut longitudinally in a manner which removes sufficient material so that each track 14*a*, 14*b* is able to seat between a respective outer sheet 20, 22 and inner sheet 24 (as shown in FIG. 13).

In one method of constructing the multi-story building 100, after the lower story peripheral wall 144 and indeed other walls of the lower story 142 have been secured to the slab 62, formwork may be erected to enable the pouring of slab 152. The formwork would include horizontal panels which have an upper surface at a level substantially flush with a lower level of the rebate 150 when the upper story walls 146 are placed on lower story walls 142. In this instance, this level corresponds with the level of the top of peripheral wall 144. Next, side panels of the formwork are attached at locations which correspond with the position of inner sheet 24 of upper peripheral wall 148 when seated on lower peripheral wall 144. The depth of the formwork corresponds with the height or depth of rebate 150. Concrete is now poured onto the formwork and allowed to set to form the suspended slab 152. Once the slab 152 has set, the formwork is removed, and the panels 12*c* are fixed to the underlying slab 152 and panels 12*b* to form the peripheral wall 108. This is achieved by fastening the bottom tracks 14*b* to the upper tracks 16 of underlying wall 144, and attaching the bottom tracks 14*a* to the slab 152 using chemical anchors or chemical fasteners. Thereafter, the panels 12*c* can be seated in the tracks 14*a* and 14*b* and fastened thereto by way of conventional screws or fasteners screwed into the outer sheets 20 and 22 into corresponding bottom tracks 14*a* and 14*b* respectively.

In an alternate method of construction of multi-story building 100, the panels 12*c* may be erected on underlying panels 12*b* with bottom tracks 14*b* fastened to the upper track 16 in the manner described hereinabove and with the additional use of stays to support the upper panels 12*c* during pouring of the suspended slab 152. However in this method, the bottom track 14a may also be provided with wire ties or bolts that extend from a bottom plate of the tracks 14a into rebate 150. Formwork is now erected in the building 100 but in this instance, the formwork only requires the laying of horizontal supports up to the lower level of rebate 150. The rebate 150 in effect forms part of the formwork to receive the poured concrete. When the concrete is poured, it flows into the rebate 150 and envelops the wire ties or bolts extending from the bottom tracks 14a.

When outer peripheral wall 148 of upper story 146 has been erected, upper tracks 16 and corner joint members 124 are seated in the slots at the upper end of the panels 12a' and attached thereto in the manner described hereinbefore.

A roof truss (not shown) can be fitted directly to the top track in the panels 12c to support a roof covering 154. Internal walls of the building 100 can be constructed from panels 12 and/or 12a.

In order to support the panels during the construction of a building and prior to fitting of the upper track 16, braces 160 as shown in FIGS. 15a-15e may be used. Brace 160 comprises a telescopically arranged outer pipe 162 and inner pipe 164. A plurality of holes 166 is formed in the outer pipe 162. One or more transverse holes (not shown) are also formed in inner pipe 164 that can register with at least one of the holes 166. Pipes 162 and 164 can be temporarily locked together by insertion of a locking pin 168 into mutually registering holes in the pipes 162 and 164. Locking pin 168 is attached to outer pipe 166 via a chain or tether 170. A plate 172 is attached to an end of inner pipe 164 distant the pipe 162 via a bracket 174 and pivot bolt 176. The pivot bolt 176 passes through the bracket 174 and inner pipe 164. Bolt 174 is fastened in a manner to enable the bracket 174 and thus the plate 172 to pivot about an axis of the bolt 176. A pair of holes 178 is formed in plate 172 to receive fasteners such as screws to attach plate 172 to a panel 12.

Brace 160 also comprises a turnbuckle 180 threadingly connected to: a stud 182 which in turn is screwed into the outer pipe 162; and, an eye stud 184 which in turn is connected to a base plate 186. A nut 188 threadingly engages the stud 182 and locks the stud 182 to the outer pipe 162. Plate 186 is attached to the eye stud 184 via a bracket 189 and pivot bolt 190 in a manner similar to the connection of plate 172. Thus the plate 186 is able to pivot about a longitudinal axis of bolt 190. A pair of holes 192 is formed in plate 186 to receive mechanical fasteners and to enable attachment to a support surface such as a slab 62 or suspended slab 162. Turning of the turnbuckle 180 enables adjustment in the length of brace 160.

The braces 160 are used to assist in supporting panels 12 during the construction of a building 100. The adjustability in length of braces 160 enable the panels 12 to be plumbed prior to attachment of the upper track 16. When the braces 160 are in use, coarse adjustment in the length of brace 160 is performed by appropriate telescoping or retracting the pipes 162 and 164 and temporarily locking them together by use of pin 168. Plate 186 may then be temporarily attached to a support surface such as slab 62 or suspended slab 152 by use of mechanical fasteners driven through the holes 192. Thereafter, plate 172 is pivoted to be in face-to-face contact with adjacent outer sheet 20 or 22 of a panel 12. Screws are then driven through holes 178 to temporarily attach the plate 172 to the panel 12. By using appropriate measurement apparatus such as plumb line, spirit line or a laser line, turnbuckle 180 is turned to adjust the overall length of brace 160 to ensure that the corresponding panel 12 is plumb, i.e. as close to vertical as practically possible. Each panel 12 of a corresponding wall is adjusted in a similar manner. Thereafter, upper track 16 is applied over two or more side-by-side adjacent panels 12 and subsequently fixed to the panels. Braces 160 may then be removed.

The panels 12 may also be modified to create decorative finishes internal of a building. For example, one or more panels 12 may be modified to produce a decorative panel incorporating a corporate logo. This may be achieved as follows. First outer sheet 20 or portion thereof may be removed from the panel 12 exposing a surface of the underlying core 26. The core 26 can be subsequently engraved or cut for example with a CNC machine to produce the desired visual effect. This portion of the exposed core 26 may then be finished with surface finishing such as paint, epoxy resins or even layers of composite material. Thus, when a building is constructed one or more of the panels 12 may be formed in this manner to produce a desired internal visual effect.

It will be appreciated that the building system 10 enables relatively thick building panels 12 to be used without compromising strength, and in particular to provide building walls which have a thickness generally corresponding to the thickness of walls of conventional buildings, such as double brick wall type buildings, without compromising strength.

It will be understood that since relatively thick walls are possible without compromising strength, it is possible to construct a building with exceptional energy ratings, in particular thermal insulation ratings, because significantly more insulating material is included in the building panels 12 than in relatively thin building panels known hitherto.

It will also be understood that since relatively thick building panels of similar thickness to conventional building walls can be used in the building process, it becomes possible to use other conventional building components such as conventional windows without compromising aesthetic appearance.

Figure 17:
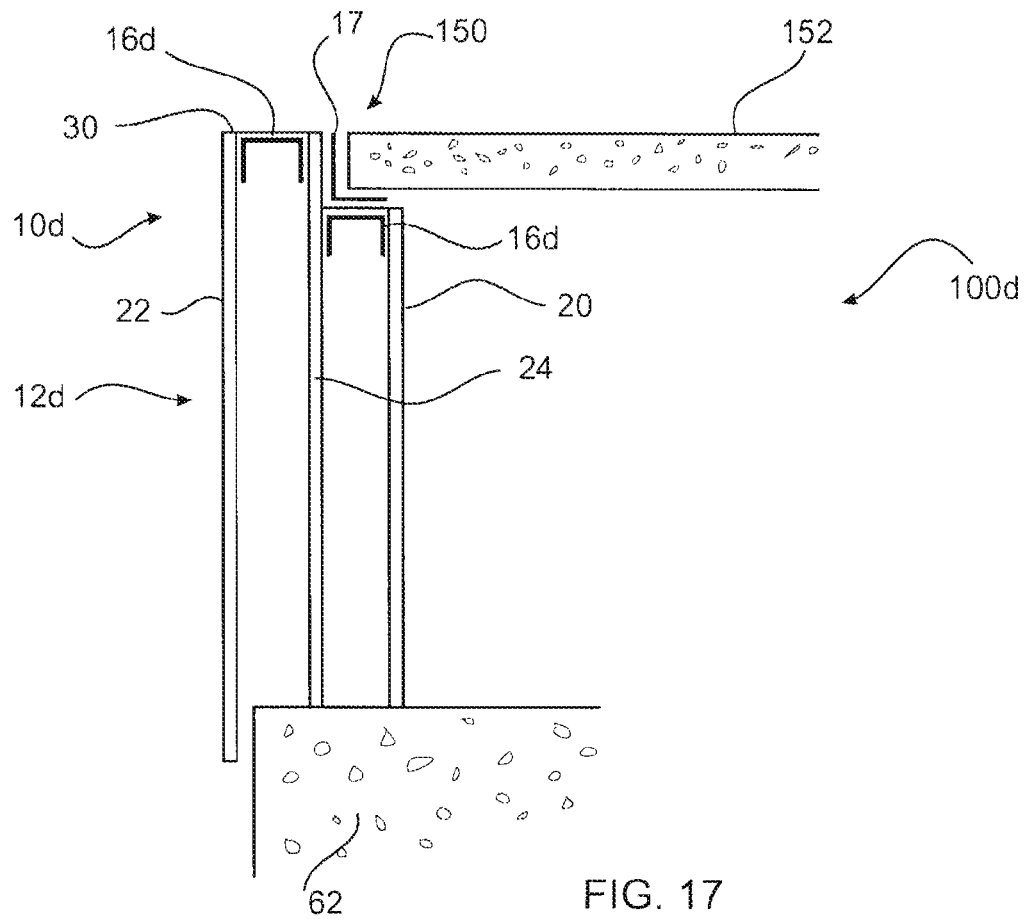

FIG. 17 illustrates a further building system 10d and associated panel 12d for constructing a multi-story building 100d. The panel 12d is similar to the panel 12c shown in FIG. 14 but orientated so that the recess 150 is at an upper end of the panel 12d rather than the lower end. Consequently, the recess 150 itself forms a part of the form work for a poured slab 152. In the building system 10d, two C channels 16d and one L channel 17 are incorporated. The panel 12d is provided with first, second, third and fourth slots 30b, 32b, 34b and 36b in a manner similar to that shown for the panel 12 in FIG. 1. One of the C channels 16d seat in slots 30b and 34b; and the other seats in slots 36b and 32b. The L channel 17 seats in the recess 150 and abuts the inner panel 24 and a base of the C channel 16d. Mechanical fasteners connect the L channel 17 to both of the C channels 16d. Thus when constructing a building 100d using the building system 10d and panel 12d, once the building system 10d has been attached to an underlying slab 62, form work is then provided as a horizontal support up to the level of the recess 150. Concrete is then poured up to the top of inner sheet 24. The recess 150 acts as part of the form work and receives a peripheral edge of the slab 152.

Figure 16:
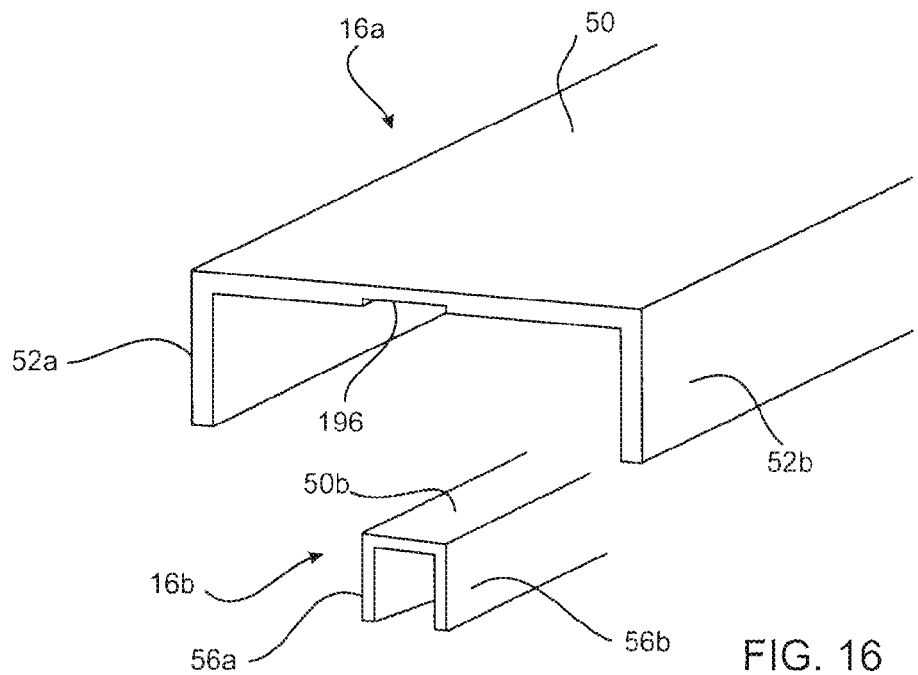
FIG. 16 is a representation of an upper track which may be utilised in a further embodiment of the building panel and building system; and, FIG. 17 illustrates a variation in a method of constructing a building in accordance with the present invention.

Now that embodiments of have been described in detail it would be apparent to a skilled addressee that many modifications and variations may be made. For example the upper track 16 may be made from two U-shaped channel members which are attached together, rather than as an integral continuous strip. This is exemplified in FIG. 16 which shows a first upper track portion 16a having the flanges 52, and a separate second upper track portion 16b that comprises the flanges 56. A recess 196 is formed in the base 50 of portion 16a to receive the base 50b of portion 16b. The portions 16 and 16b can then be connected together for example by spot welds or rivets for form an upper track which is substantially the same in configuration and function as the upper track 16.

In a further modification the first or lower side 31 of the panel 12, 12a, 12b may be formed with slots corresponding to slots 34b and 36b on opposite sides of inner sheet 24 and the lower track member 14 replaced with a further second track 16. In yet a further modification the second or upper track 16 can be provided with only one of flanges 56a and 56b which is connected to the inner sheet 24. In that modification the panel 12 can be correspondingly modified by being formed with only one of slot 34b and 36b.

All such modifications together with others that would be obvious to persons of ordinary skill in the art are deemed to be within the scope of the present invention.

The invention claimed is:

1. A building system comprising:
   a building panel comprising first and second outer sheet members, an inner sheet member disposed between the first and second outer sheet members, and solid insulating material disposed between the first and second outer sheet members and the inner sheet member, wherein a top surface of the first and second outer sheet members, a top surface of the inner sheet member and a top surface of the solid insulating material are planar and a bottom surface of the first and second outer sheet members, a bottom surface of the inner sheet member and a bottom surface of the solid insulating material are planar;
   a first track member, the first track member and the building panel being arranged such that the panel is engagable along a first side with the first track member and the first track member is connectable to the first and second outer sheet members;
   a second track member comprising a first portion with two flanges and a second portion with two flanges, wherein a first flange of the first portion is engagable with the first outer sheet member, a second flange of the first portion is engagable with the inner sheet member, a first flange of the second portion is engagable with the second outer sheet member, and a second flange of the second portion is engagable with the inner sheet member, and wherein the first and second flanges of the first portion and the first and second flanges of the second portion extend below the top surface of the first and second outer sheet members, the top surface of the inner sheet member and the top surface of the solid insulating material and wherein the solid insulating material is disposed between the first and second flanges of the first portion and between the first and second flanges of the second portion.

2. The building system according to claim 1 wherein the first flange of the first portion extends adjacent to and parallel with the first outer sheet member when the second track member is engaged with the panel and the second flange of the first portion extends adjacent to and parallel with the inner sheet member on a side nearest the first outer sheet member when the second track member is engaged with the panel.

3. The building system according to claim 2 wherein the first flange of the second portion extends adjacent to and parallel with the second outer sheet member when the second track member is engaged with the panel and the second flange of the second portion extends adjacent to and parallel with the inner sheet member on a side nearest the second outer sheet member when the second track member is engaged with the panel.

4. The building system according to claim 3 wherein one of the first and second outer sheet members is thicker than the other of the first and second sheet members.

5. The building system according to claim 4 wherein at least one of the first and second outer sheet members is substantially waterproof.

6. The building system according to claim 5 wherein, at least one of the inner and outer sheet members is formed of cement fibre board material.

7. The building system according to claim 6 wherein, the solid insulating material comprises a rigid polymer.

8. The building system according to claim 7 wherein the solid insulating material has a density about 45 Kg/m$^3$.

9. The building system according to claim 8 wherein the rigid polymer comprises one of: polyurethane (PU) foam material; and, polyisocyanurate (PIR).

10. The building system according to claim 9 wherein one or both of the first track member and the second track member is formed of steel material.

11. The building system according to claim 10 comprising a side track member, the side track member and the building panel being arranged such that the side track member is engagable with a third side of the building panel between the first track member and the second track member.

12. The building system according to claim 11 wherein the side track member is configured to be engagable with each of two laterally adjacent building panels.

13. The building system according to claim 12 wherein the panel comprises first and second slots extending along each of the first and second sides of the panel to receive the first and second track members, the first slot being at an interface between the first outer sheet member and the insulating material, and the second slot being at an interface between the second outer sheet member and the insulating material.

14. The building system according to claim 13 wherein the panel comprises a third slot extending along the second side being at an interface between the inner sheet member and the insulating material on a side of the first outer sheet member.

15. The building system according to claim 14 wherein the panel comprises a fourth slot extending along the second side being at an interface between the inner sheet member and the insulating material on a side of the second outer sheet member.

16. The building system according to claim 1, wherein the two flanges of the first portion are spaced apart a first distance, the two flanges of the second portion are spaced apart a second distance, and the second flange of the first portion and the first flange of the second portion are spaced apart a third distance; and
   wherein the third distance is less than half the first distance and the third distance is half the second distance.

17. The building system according to claim 1, wherein a top surface of the first and second outer sheet members, a top surface of the inner sheet member and a top surface of the solid insulting material form a planar top surface and a bottom surface of the first and second outer sheet members, a bottom surface of the inner sheet member and a bottom surface of the solid insulating material form a planar bottom surface.

18. A building panel for use in a building system comprising first and second track members and building panels disposed there between, the building panel comprising:
   a first outer sheet member;
   a second outer sheet member;
   an inner sheet member disposed between the first and second outer sheet members; and
   solid insulating material disposed between the first and second outer sheet members and the inner sheet member;
   the building panel received in a first track member and a second track member; and the building panel being arranged such that the second track member is engagable with the inner sheet member and at least one of the first and second outer sheet member;

wherein the second track member comprises:
- a first planar side; and
- a second side with a first flange, a second flange, a third flange, and a fourth flange projecting away from the second side;
- wherein the first flange and the second flange are spaced apart a first distance, the third flange and the fourth flange are spaced apart a second distance, and the second flange and the third flange are spaced apart a third distance, the third distance being less than half the first distance and less than half the second distance.

* * * * *